United States Patent
Spurr et al.

(10) Patent No.: US 11,044,792 B2
(45) Date of Patent: Jun. 22, 2021

(54) VEHICLE OCCUPANT MONITORING SYSTEM AND METHOD

(71) Applicant: Visteon Global Technologies, inc., Van Buren Township, MI (US)

(72) Inventors: Michael Spurr, Essex (GB); Mike Lees, Essex (GB)

(73) Assignee: Visteon Global Technologies, Inc., Van Buren Township, MI (US)

(*) Notice: Subject to any disclaimer, the term of this patent is extended or adjusted under 35 U.S.C. 154(b) by 131 days.

(21) Appl. No.: 16/542,689

(22) Filed: Aug. 16, 2019

(65) Prior Publication Data

US 2020/0059998 A1 Feb. 20, 2020

(30) Foreign Application Priority Data

Aug. 16, 2018 (EP) .................................... 18189224

(51) Int. Cl.
*H05B 33/08* (2020.01)
*G01J 1/42* (2006.01)
(Continued)

(52) U.S. Cl.
CPC ............. *H05B 45/37* (2020.01); *B60R 16/03* (2013.01); *G01J 1/42* (2013.01); *H02J 7/0068* (2013.01);
(Continued)

(58) Field of Classification Search
None
See application file for complete search history.

(56) References Cited

U.S. PATENT DOCUMENTS

| 6,324,453 | B1 | 11/2001 | Breed et al. |
| 2003/0125855 | A1* | 7/2003 | Breed ................ B60N 2/002 701/36 |

(Continued)

FOREIGN PATENT DOCUMENTS

| DE | 102015106305 A1 | 10/2016 |
| EP | 3012664 A1 | 4/2016 |
| EP | 3252725 A1 | 12/2017 |

OTHER PUBLICATIONS

European Search Report from the European Patent Office for related EP Application No. 18189224.1 dated Apr. 30, 2019, 12 pages.

*Primary Examiner* — Jared Fureman
*Assistant Examiner* — Aqeel H Bukhari
(74) *Attorney, Agent, or Firm* — Quinn IP Law

(57) ABSTRACT

A system includes a switch-mode power supply for drawing low and constant current from a power source. The switch-mode power supply may charge an energy storage element with low and constant current. In a normal condition, a current driver may cause the illuminator to emit electromagnetic radiation as a plurality of flashes. In the normal condition, the system may include an average power that is less than or equal to a threshold value associated with the illuminator. In a fault condition, the illuminator may continuously emit electromagnetic radiation, at low current. In the fault condition, the switch-mode power supply may supply low and constant current to the illuminator. Similarly, in the fault condition, the system may include an average power that is less than or equal to a threshold value associated with the illuminator.

20 Claims, 5 Drawing Sheets

(51) Int. Cl.
*H02J 7/00* (2006.01)
*B60R 16/03* (2006.01)
*H05B 45/37* (2020.01)
*H02J 7/34* (2006.01)

(52) U.S. Cl.
CPC ....... *G01J 2001/4238* (2013.01); *H02J 7/345* (2013.01)

(56) References Cited

U.S. PATENT DOCUMENTS

2011/0285526 A1    11/2011  Tanaka et al.
2014/0028861 A1*   1/2014   Holz .................. H04N 5/357
                                                348/208.4

* cited by examiner

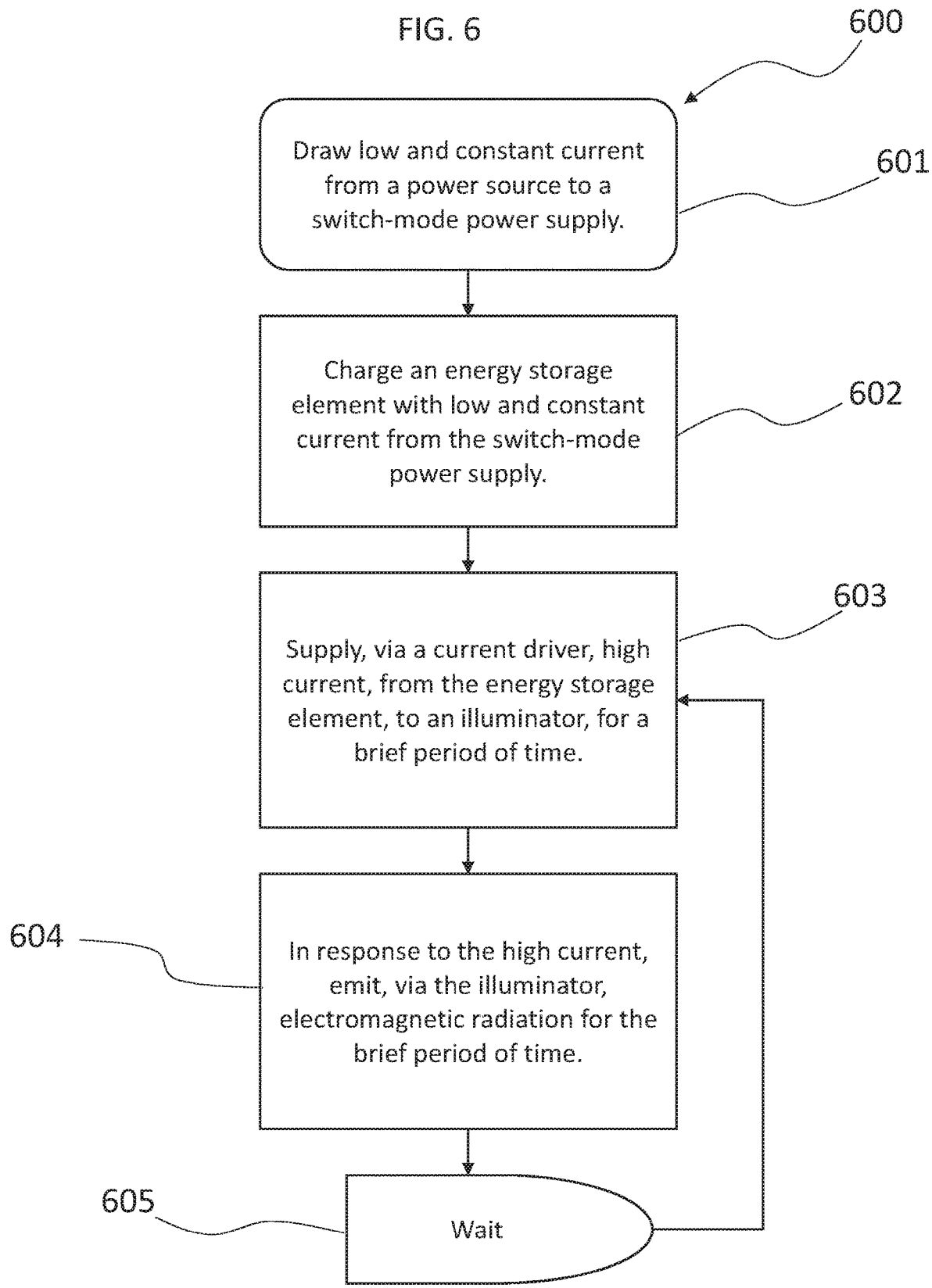

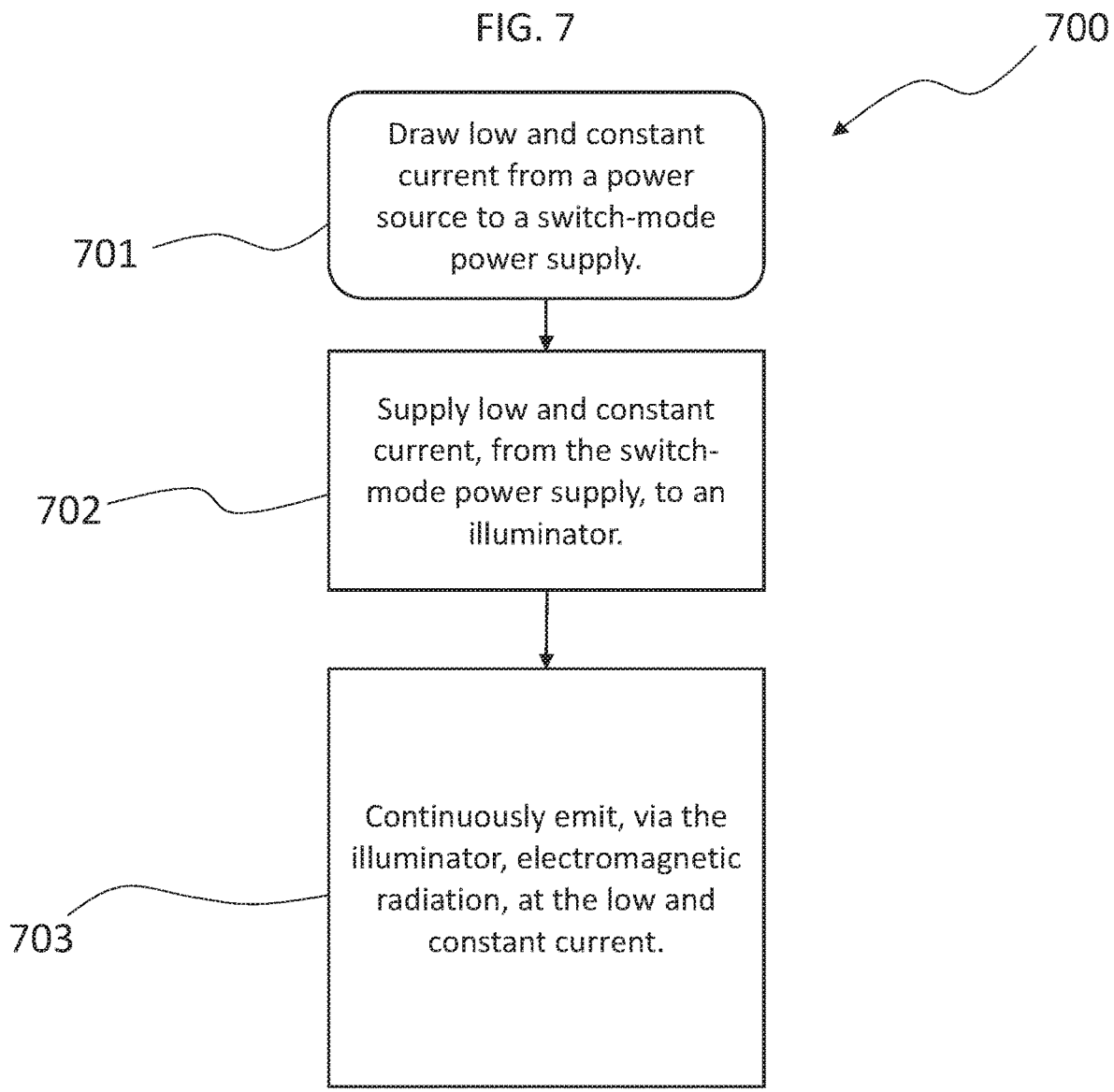

VEHICLE OCCUPANT MONITORING SYSTEM AND METHOD

CROSS-REFERENCES TO RELATED APPLICATIONS

This patent application claims priority to the European Patent Application Serial No. 18189224.1, filed Aug. 16, 2018, which is incorporated herein by reference in its entirety.

TECHNICAL FIELD

One or more embodiments herein generally describe a system and a method for monitoring an occupant in a vehicle. The system may include an illuminator, such as an infrared light emitting diode (IR LED), and a detection device, such as a camera.

BACKGROUND

A conventional infrared system for object detection includes an infrared emitter and an infrared sensor. The infrared emitter emits bright infrared light. This is a product of the conventional system supplying high current to the infrared emitter. The bright infrared light may make an object visible to the infrared sensor. The infrared emitter, in a fault condition, may continuously emit bright infrared light, at the high-current. This may exceed a threshold value associated with an average power for the infrared emitter. The threshold value may be set to correspond with an exposure limit associated with infrared light. As such, the infrared emitter, in the fault condition, may emit bright infrared light that exceeds the exposure limit.

The conventional infrared system may be included in a vehicle. The vehicle may need relatively large and heavy wiring and electrical components, such as for power conversion, protection, or filtering, for the conventional system. The largeness and heaviness may be needed in order to handle voltage drops associated with the conventional system, in the vehicle. Moreover, the largeness and heaviness may be needed to carry the high current from a power source of the vehicle to the conventional system. The high current may occur for short periods of time. The conventional system may draw high current, from the power source, for short periods of time, at a high frequency. In between drawing high current, for short periods of time, the conventional system may be off, and as such may not draw any current. During a normal operation, when off, the infrared emitter may not emit any infrared light. And when on, during the normal operation, the conventional system may supply the infrared emitter with high current, for a short period of time, to cause the infrared emitter to emit bright infrared light for the short period of time. The normal operation of the conventional system may present challenging voltage drops, such as instantaneous voltage drops. For example, the voltage may rapidly spike or fall, depending on whether high current is or is not being drawn. The rapid and wide changes associated with the voltage drops may necessitate using the large wiring and electrical components. Furthermore, drawing the high current, from the power source, for short periods of time, occurring at the high frequency, may produce electrical noise, which may interfere with other systems of the vehicle.

SUMMARY

One or more embodiments may describe a system for monitoring an occupant in a vehicle. The system may include an illuminator for emitting electromagnetic radiation. The illuminator may include an infrared light emitting diode (IR LED). The electromagnetic radiation may be infrared light. The system may include a current driver electrically connected to the illuminator. The current driver may receive a signal from a detection device. The signal, from the detection device, may be a synchronization signal. The synchronization signal may align an emission of electromagnetic radiation from the illuminator with an operation of the detection device. The system may include an energy storage element electrically connected to the current driver. The energy storage element may include a capacitor. The system may include an electrical monitor device for monitoring an electrical property of the energy storage element. The electrical property may be voltage. The electrical monitor device may determine whether a fault condition exists or whether the system is operating in a normal condition. The system may include a switch-mode power supply. The switch-mode power supply may be electrically connected to the energy storage element. The switch mode power supply may receive a power signal from a power source. The switch-mode power supply may draw low and constant current, in the power signal, from the power source. The switch-mode power supply may charge the energy storage element with low and constant current.

In a fault condition, the illuminator may be continuously emitting electromagnetic radiation. During the fault condition, the switch-mode power supply may supply the illuminator with low and constant current. In the fault condition, the energy storage element may be depleted of energy.

In the fault condition, an average power associated with the emission of electromagnetic radiation, based on the low and constant current, may be less than or equal to a threshold value associated with the illuminator.

During normal operation, the system may cause the illuminator to emit electromagnetic radiation as a plurality of flashes. In each flash, the illuminator may emit electromagnetic radiation for a brief period of time. The current driver may supply high current, from the energy storage element, to the illuminator, for the brief period of time. Each flash may thus be in response to each supply of high current. In between each flash, the illuminator may be off. When off, the illuminator may not any emit electromagnetic radiation. Further when off, the current driver may not supply any current to the illuminator. Each flash may include a peak power that exceeds, for the brief period of time, the threshold value associated with the illuminator. The system, however, may include a low-duty cycle. As such, during the normal operation, an average power associated with the emission of electromagnetic radiation may be less than or equal to the threshold value associated with the illuminator.

One or more embodiments relate to a system for monitoring an occupant in a vehicle, the system comprising an illuminator for emitting electromagnetic radiation; a current driver electrically connected to the illuminator, the current driver configured to receive a signal from a detection device; an energy storage element electrically connected to the current driver; an electrical monitor device configured to monitor an electrical property of the energy storage element; and a switch-mode power-supply electrically connected to the energy storage element and configured to receive a power signal from a power source, wherein the switch-mode power supply is configured to draw low and constant current, in the power signal, from the power source.

In one or more embodiments, the switch-mode power supply is configured to produce an output signal that is current-limited and voltage-limited, for charging the energy storage element.

In one or more embodiments, the switch-mode power supply is configured to produce an output signal having an average power that is less than or equal to a threshold value.

In one or more embodiments, the switch-mode power supply is configured to supply low and constant current to the illuminator, when the energy storage element is depleted of energy.

In one or more embodiments, the illuminator is configured to emit electromagnetic radiation at an average power that is less than or equal to a threshold value associated with the illuminator.

In one or more embodiments, the illuminator is configured to emit electromagnetic radiation as a plurality of flashes, in each flash, the illuminator is configured to emit electromagnetic radiation for a brief period of time, and in between each flash, the illuminator is configured to be off.

In one or more embodiments, the illuminator is configured to include a low-duty cycle for producing an average power that is at or below a threshold value associated with the illuminator.

In one or more embodiments, the illuminator is configured to produce, for each flash of the plurality of flashes, a peak power that exceeds the threshold value for the brief period of time.

In one or more embodiments, current driver is configured to supply high-current, from the energy storage element, to the illuminator, for each flash of the plurality of flashes.

In one or more embodiments, the current driver is configured to receive a synchronization signal, as the signal, from the detection device, for synchronizing an emission of electromagnetic radiation from the illuminator with an operation of the detection device.

In one or more embodiments, the energy storage element includes a capacitor, and the capacitor is configured to receive low and constant current from the switch-mode power supply for charging the capacitor.

In one or more embodiments, the illuminator includes an infrared light-emitting diode (IR LED), and the IR LED is configured to emit electromagnetic radiation in the form of infrared light for monitoring the occupant.

In one or more embodiments, the detection device includes a camera configured to detect infrared light for monitoring the occupant.

One or more embodiments of the present disclosure describe a method comprising the steps of monitoring, via the electrical monitor device, the electrical property of the energy storage element; determining a fault condition based on the monitoring of the electrical property; supplying, during the fault condition, low and constant current from the switch-mode power supply to the illuminator; emitting electromagnetic radiation in response to the low and constant current; and producing an average power associated with the emission of electromagnetic radiation that is less than or equal to a threshold value associated with the illuminator.

In one or more embodiments, the method comprises the steps of drawing low and constant current from the power source to the switch-mode power supply; charging the energy storage element with low and constant current from the switch-mode power supply; supplying high current from the energy storage element, through the current driver, to the illuminator, for brief periods of time; emitting, in response to the high current supply for brief periods of time, electromagnetic radiation from the illuminator as a plurality of flashes; and producing an average power that is less than or equal to a threshold value associated with the illuminator.

BRIEF DESCRIPTION OF THE DRAWINGS

FIG. 6 illustrates an operation of a system, under a normal condition, for monitoring an occupant, which is in accordance with one or more embodiments.

FIG. 7 illustrates an operation of a system, under a fault condition, for monitoring an occupant, which is in accordance with one or more embodiments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One or more embodiments of the present invention generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation desired. It is recognized that any circuit or other electrical device disclosed herein may include any number of microcontrollers, processors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform any operation(s) disclosed herein. In addition, any one or more of the electrical devices may be configured to execute a computer-program that is embodied in a non-transitory computer readable medium that is programmed to perform any number of the functions as disclosed.

Figure 1:
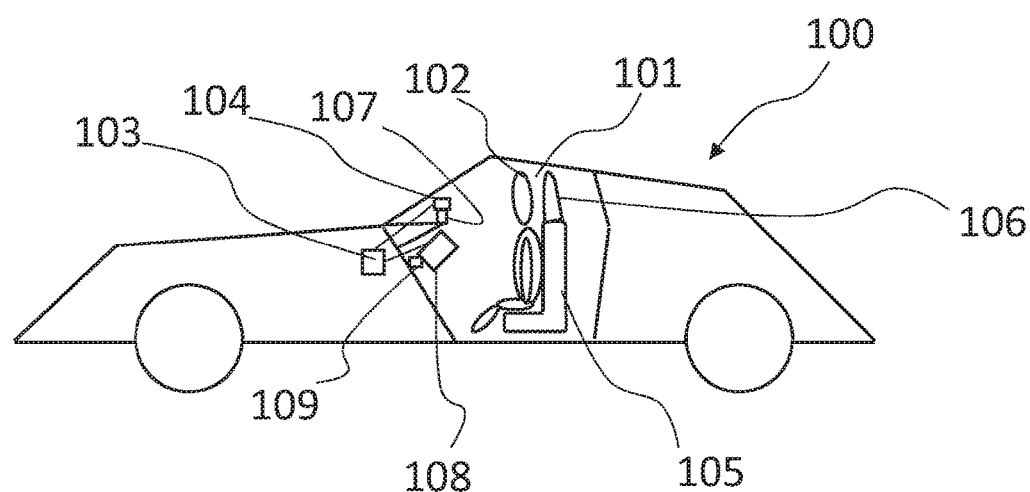
FIG. 1 illustrates a schematic view of a vehicle having a system for monitoring an occupant, which is in accordance with one or more embodiments.

In accordance with one or more embodiments herein, FIG. 1 illustrates a schematic view of a vehicle 100. The vehicle 100 may be a land vehicle, such as a car, a truck, or a sport-utility vehicle (SUV), an amphibious vehicle, an aircraft, or a watercraft. The vehicle 100 may be an autonomous vehicle, a semi-autonomous vehicle, or a driver-operated vehicle.

The vehicle 100 includes a passenger compartment 101. In the passenger compartment 101, the vehicle 100 may have an occupant 102. In addition to the occupant 102, the passenger compartment 101 may have one or more additional occupants. The occupant 102 may be a driver of the vehicle 100. As one alternative, the occupant 102 may be a passenger in the vehicle 100.

The vehicle 100 may include a system 103 for monitoring one or more occupants in the vehicle 100, such as the occupant 102. The system 103 may be positioned to monitor one or more occupants in the passenger compartment 101, such as the occupant 102. The system 103 may include an illuminator 104, such as an infrared light emitting diode (IR LED).

The illuminator 104, such as through an IR LED, may emit infrared light. The occupant(s), such as the occupant 102, may be unable to detect the infrared light. For example, the occupant 102 may be a human being. In such a case, the occupant 102 would be unable to see infrared light with his/her naked eyes, for human beings are unable to do so. This may be beneficial to the occupant 102, for the occupant 102 may concentrate on other tasks or systems, as opposed to the system 103. The system 103 may, thus, operate without requiring an occupant 102 to interact with the system 103. Moreover, the system 103 may operate outside of a visible light spectrum for the occupant 102.

Utilizing infrared light may improve the performance of the system 103. For example, the infrared light may allow the system to detect the occupant's 102 eyes, such as his/her pupils, even when an article is covering the occupant's 102 eyes. For example, the infrared light may allow the system 103 to detect the occupant's 102 pupils, even when the occupant 102 is wearing glasses, such as sun glasses. This may be by utilizing near infrared light. The system 103 may carry-out additional functionality associated with detecting the occupant's 102 eyes.

During operation, the system 103 may include a threshold value for average power associated with the illuminator 104. The system 103 may utilize a flashing approach for causing the illuminator 104 to emit infrared light. The flashing approach may include high-peak powers for each flash of infrared light. Each flash may last a brief period of time. In between the flashes, the illuminator 104 may be off. As a byproduct of that time off, in between flashes, the system 103 may have a low duty cycle. In between flashes, the system 103 may produce a zero-value for power. That zero-value may occur for a duration of time. The duration of time may be longer than the brief period of time associated with a flash. Therefore, a flash may have a high peak power that lasts a brief period of time, and thereafter, the illuminator 104 may have a zero-value for power that lasts a duration of time off. This may yield an average power that is at or below the threshold value. The threshold value may be set to correspond with an exposure limit associated with infrared light. The exposure limit may be a standardized value set for a class associated with the occupant 102, such as human beings. The system 103 may be designed to maximize peak powers for the flashes, while maintaining an average power that is at or below the threshold value. In normal operation, while the peak powers may temporarily exceed the threshold value, the flashing approach may cause the average power to be at or below the threshold value. This, again, may be due to the low duty cycle. Maximizing peak powers may allow the detection device 108 to better detect the occupant 102. And maintaining the average power to be at or below the threshold value may allow the system 103 to operate at or below the exposure limit.

In the event that the system 103 develops a fault condition that transitions from operating under the flashing approach to a constant emission approach, the system may still operate at or below the threshold value for average power for the illuminator 104. While the illuminator 104 may continually emit infrared light, because of the fault condition in the constant emission approach, the system 103 may reduce power to the illuminator 104. This may prevent the illuminator 104 from continually emitting infrared light at a peak power. The reduction may be such that the system 103 still operates at or below the threshold value. Thus the system may still include an average power that is at or below the threshold value. As such, the system 103 may operate at or below the exposure limit for infrared light.

The illuminator 104 may be mounted to a surface in the passenger compartment 101, such as a dashboard. As one alternative, the illuminator 104 may be mounted externally to the passenger compartment 101.

The illuminator 104 may emit electromagnetic radiation, such as infrared light, toward a seat 105 in the passenger compartment 101. The illuminator may be positioned to emit electromagnetic radiation toward a headrest 106 of the seat 105. The illuminator 104 may have an emission pattern, for electromagnetic radiation, that at least includes a portion of the headrest 106 of the seat 105. The occupant 102 may be seated in the seat 105 such that the occupant's head may rest against the headrest 106. Thus the illuminator 104 may emit electromagnetic radiation toward the head of the occupant 102. The illuminator 104, in relation to the occupant 102, may be positioned such that the emission pattern may at least include a portion of the head of the occupant 102. As one example, the illuminator 104 may be positioned such that the emission pattern at least includes a face of the occupant 102. As another example, the illuminator 104 may be positioned such that the emission pattern at least includes an eye of the occupant 102.

In the vehicle 100, the emission pattern for the illuminator 104 may cover a headbox. The headbox is a volumetric space in the vehicle that may be associated with an occupant's head, such as occupant's 102 head. As such, the occupant's 102 head may be located in the headbox. The headbox may be positioned in front of the seat 105. The headbox may include a portion of the seat 105, such as the headrest 106. The illuminator 104 may be attached to a mechanism 107 for adjusting the positioning of the illuminator 104. The mechanism 107 may include one, two, three, four, five, or six degrees of freedom for positioning the illuminator 104. The mechanism 107 may be an electromechanical mechanism, which, based on receipt of an electrical signal from the system 103, may move in one or more directions. The mechanism 107 may be in electrical or wireless communication with the system 103, for positioning the illuminator 104. The system 103 may automatically adjust the positioning of the illuminator 104. As another alternative, the illuminator 104 may be installed in a fixed orientation. This may prevent the illuminator 104 from being able to move, such as for repositioning purposes.

The system 103 may include a detection device 108, such as a camera. The detection device 108 may be able to detect electromagnetic radiation, such an infrared light, emitted from the illuminator 104. The detection device 108 may be mounted to the same surface in the passenger compartment 101 as the illuminator 104 or a different surface in the passenger compartment 101. As one alternative, the detection device 108 may be mounted externally to the passenger compartment 101.

The detection device 108 may be positioned to have a field of view that includes a portion of the seat 105. For example, the detection device 108 may be positioned such that the field of view includes the head rest 106 of the seat 105. Therefore, when the occupant 102 is seated in the seat 105, such that the occupant's head may rest against the headrest 106, the field of view may include a portion of the head of the occupant 102. The portion of the occupant's 102 head may include the face of the occupant 102 or at least an eye of the occupant 102. The field of view for the detection device 108 may cover the headbox. The field of view of the detection device 108 may overlap, at least in part, with the emission pattern of the illuminator 104. Thus the detection device 108 may detect electromagnetic radiation from the illuminator 104.

Similar to the illuminator 104, the detection device 108 may be attached to a mechanism 109 for adjusting the positioning of the detection device 108. The mechanism 109 may include one, two, three, four, five, or six degrees of freedom for positioning the detection device 108. The mechanism 109 may be in electrical or wireless communication with the system 103, for positioning the detection device 108. The mechanism 109 for the detection device 108 may be an electro-mechanical mechanism. The system 103 may automatically adjust the positioning of the detection device 108. As another alternative, the detection device 108 may be installed in a fixed position. As another example, the system 103 may include a feedback sub-system that may allow one or more occupants, such as the occupant 102, to adjust the position of the detection device 108. The feedback sub-system may provide a feed from the detection device 108 to a display, which may show what the detection device 108 may be seeing. As such, the feedback sub-system may allow the occupant 102 to adjust the detection device 108 so that the field of view, of the detection device, may include the occupant's 102 head.

The illuminator 104 may have a first unobstructed view of the seat 105. The first unobstructed view may allow the illuminator to emit electromagnetic radiation to the seat 105, such as to the headrest 106. The detection device 108 may have a second unobstructed view of the seat 105. The second unobstructed view of the seat 105 may allow the detection device 108 to detect electromagnetic radiation emitted from the illuminator to the seat 105, such as to the head rest 106.

The illuminator 104 and the detection device 108 may be spatially offset from one another in the vehicle 100. For example, in the vehicle 100, the illuminator 104 may be vertically offset from the detection device 108. As one example of the vertically offset, the illuminator 104 may be closer to a roof of the vehicle 100, whereas the detection device 108 may be closer to a floor pan of the vehicle 100. As an alternative example of the vertically offset, the illuminator 104 may be closer to the floor pan, whereas the detection device 108 may be closer to the roof. As another example, in the vehicle 100, the illuminator 104 may be laterally offset from the detection device 108. As one example of the laterally offset, the illuminator 104 may be closer to a left side of the vehicle 100, whereas the detection device 108 may be closer to a right side of the vehicle 100. As an alternative example, the illuminator 104 may be closer to the right side, whereas the detection device 108 may be closer to the left side. As another example, in the vehicle 100, the illuminator 104 may be longitudinally offset from the detection device 108. As one example of the longitudinally offset, the illuminator 104 may be closer to a front of the vehicle 100, whereas the detection device 108 may be closer to a rear of the vehicle 100. As an alternative, the illuminator 104 may be closer to the rear, and the detection device 108 may be closer to the front. The illuminator 104 and the detection device 108 may be spatially offset in order to yield the first unobstructed view and the second unobstructed view of the seat 105.

The system 103, at least through the illuminator 104 and the detection device 108, may monitor the occupant 102 in the vehicle 100. The system may include additional illuminators, beyond the illuminator 104. Furthermore, the system may include additional detection devices, beyond the detection device 108. This may be to monitor one or more other occupants in the vehicle 100, beyond the occupant 102. As an alternative, this may be to provide back-up redundancies, in case the illuminator 104 or the detection device 108 fails. As another alternative, this may be to increase a confidence level of the system 103 in monitoring the occupant 102.

The illuminator 104 and the detection device 108 may be co-located with one another. As such, the illuminator 104 and the detection device may be located in the same housing. A second illuminator may be spatially offset from the co-located illuminator 104 and detection device 108. A third illuminator may be spatially offset from the co-located illuminator 104 and detection device 108. The second illuminator may be laterally spaced from a first side of the co-located illuminator 104 and detection device 108. The third illuminator may be laterally spaced from a second side of the co-located illuminator 104 and detection device 108. Each of the co-located illuminator 104 and detection device 108, the second illuminator, and the third illuminator may be positioned to have unobstructed views of at least a portion of the seat 105. The co-located illuminator 104 and detection device 108, and the second illuminator, and the third illuminator may monitor the occupant 102, such as the occupant's eyes. This set-up and arrangement may enhance detecting and tracking the occupant's 102 pupils. As an example, this set-up and arrangement may enhance bright pupil detection and tracking and dark pupil detection and tracking.

A system for monitoring an occupant of a vehicle may yield numerous benefits. For example, such a system may yield an increase in safety for an occupant and others, such as other occupants in the vehicle, other vehicles, occupants in other vehicles, or pedestrians. As an example, the system may monitor an occupant in a driver seat. When the vehicle is operating in an autonomous-drive mode, the vehicle may monitor the occupant in the driver seat to determine whether the occupant may be able to take back control of the vehicle, such as in case an event occurs where the vehicle would prefer switching back to occupant-driven mode, as opposed to continuing operation in autonomous-drive mode. While the event may result in that preference, if the occupant in the driver seat is incapacitated, experiencing an already high workload, or is otherwise unavailable, then the system may refrain from switching back to occupant-driven mode. Instead, the system may continue on in autonomous-drive mode or determine a different course of action. This may be preferable to automatically switching modes, regardless of the occupant's state. As another example, monitoring an occupant may help detect drowsiness conditions, workload conditions, or otherwise tailor systems on-board the vehicle accordingly. This may result in a better user experience for the occupant. For example, through monitoring, the system may determine the occupant's gaze. The vehicle may tailor a system, such as an augmented reality head-up display, based on the occupant's gaze. As another example, through monitoring, the system may generate alerts for the occupant, such as a recommendation on lodging based on a drowsiness determination. As another example, the system may communicate with other vehicles, pedestrians, or other entities outside of the vehicle, based on determinations of monitoring the occupant. This may be done through V2X communication.

Figure 2:
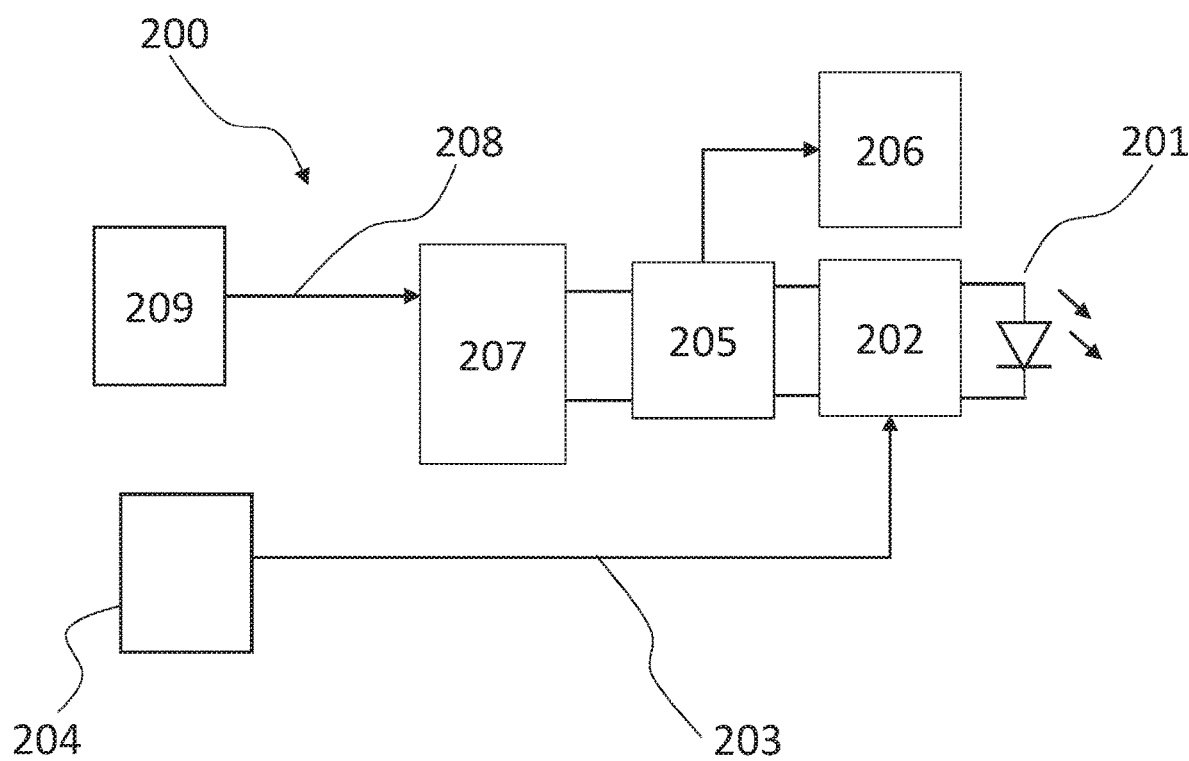
FIG. 2 illustrates a schematic view of a system for monitoring an occupant of a vehicle, which is in accordance with one or more embodiments.

In accordance with one or more embodiments herein, FIG. 2 illustrates a schematic view of a system 200 for monitoring an occupant in a vehicle. The system includes an illuminator 201. The system 200 may include additional illuminators, beyond the illuminator 201. The illuminator 201 may be electrically connected to a current driver 202. The current driver 202 may include a high-current driver for the illuminator 201, such as a high-current LED driver. The current driver 202 may receive a signal 203 from a detection device 204. The signal 203 from the detection device 204 may be a synchronization signal. The synchronization signal may synchronize an operation of the illuminator 201 to correspond with an operation of the detection device 204, such as illumination of the illuminator 201 to correspond with a shutter of a camera, when the camera is the detection device 204. Additionally, the current driver 202 may be electrically connected to an energy storage element 205. The energy storage element 205 may include a capacitor. The energy storage element 205 may be electrically connected to an electrical monitor device 206. The electrical monitor device 206 may receive a signal from the energy storage element 205. The electrical monitor device 206 may monitor an electrical property in the signal from the energy storage element 205, such as voltage. The electrical monitor device 206 may include a processor. The electrical monitor device 206 may include a voltage monitor. The energy storage element 205 may be electrically connected to a switch-mode power-supply 207. The switch-mode power-supply 207 may include a low-current switch-mode power-supply. The switch-mode power-supply 207 may receive a power signal 208 from a power source 209, such as a DC power source, such as a DC battery on board the vehicle, or an AC power source, of the vehicle. The switch-mode power-supply 207 may have an output that is current-limited, voltage-limited, or both.

In one example, from the power source 209 of the vehicle, the system 200 may draw low and constant current. The low current may be under 3 amps, such as at or around 0.2 amps. One benefit of drawing low and constant current is that wiring for the system 200, in the vehicle, may be small and light. Compared to a conventional system that draws high current, for short periods of time, at a high frequency, with periods of no current in-between, the wiring for the system 200 may be smaller and lighter because of the low and constant current draw. Using smaller and lighter components may yield cost and weight savings. In the automotive space, such savings are particularly desirable. Similarly, in addition to the wiring, other electronic components, such as for power conversion, protection, or filtering, for the system 200 may be small and light, particularly when compared to the conventional system. In addition to yielding cost and weight savings, there may be packaging benefits associated with using smaller and lighter components for the system 200 in the vehicle. Moreover, the system 200 may include a small voltage drop, at least compared to the conventional system. This may be a byproduct of drawing low and constant current from the power source 209 of the vehicle. Whereas the conventional system may rapidly transition from drawing high current, for short periods of time, to no current, the system 200 may draw low and constant current. This may result in a smaller voltage drop than those associated with the conventional system. Compared to the conventional system, the system 200 may yield less electrical noise, because of drawing low and constant current from the power source 209. The reduction in electrical noise may yield better performance of the system 200 and other systems in the vehicle. As such, the reduction in electrical noise may benefit other systems in the vehicle.

In one example of the system 200, the illuminator 201 includes an IR LED, the current driver 202 includes a high-current LED driver, the detection device 204 includes a camera, the energy storage element 205 includes a capacitor, the electrical monitor device 206 includes a voltage monitor, and the switch-mode power-supply 207 includes a low-current switch-mode power-supply. The IR LED is electrically connected to the high-current LED driver. The high-current LED driver is electrically connected to the camera and the capacitor. The capacitor is electrically connected to the voltage monitor and the low-current switch-mode power-supply. The low-current switch-mode power-supply is electrically connected to the power source of the vehicle.

From the power source of the vehicle, the low-current switch-mode power-supply may draw low and constant current. For example, this may be under 3 amps, such as at or around 0.2 amps. The low-current switch-mode power-supply may charge the capacitor with the low and constant current. The capacitor may store electrical energy from the low and constant current. The voltage monitor may monitor voltage associated with the capacitor. In doing so, the voltage monitor may analyze power drawn from the IR LED, which may determine whether a fault condition exists in the system 200. The high-current LED driver may cause the capacitor to discharge the stored electrical energy to power the IR LED. The high-current LED driver may receive a synchronization signal from the camera. The synchronization signal may temporally align the operation of the IR LED with the operation of the camera, such as operation of a shutter of the camera. The camera may be configured to detect and record infrared light. Through the synchronization signal, the IR LED may be operated (i.e., emit infrared light), when the camera is on and able to detect and record infrared light. Thus the IR LED may be synchronized to operate with the camera.

In this example, during a normal operation of the system 200, the IR LED emits infrared light for a brief period of time. For example, the brief period of time may be under 1 millisecond. This is called a flash. During the normal operation, there may be one or more flashes. However, in the normal operation, the IR LED is not continuously emitting infrared light. As such, the one or more flashes may be discontinuous, and in between each flash, the IR LED may be off. During a flash, the IR LED receives high current from the capacitor, via the high-current LED driver. The high-current LED driver may control the one or more flashes. The flashes may be based on the synchronization signal. In the system 200, high current may extend through the duration of the flash. The high-current LED driver causes the capacitor to discharge the stored electrical energy as high current. One reason for providing high current to the IR LED is to increase visibility of the occupant in the vehicle. When the IR LED emits infrared light as a byproduct of high current, the camera is able to better detect and record the occupant in the vehicle. A better experience for the occupant, though, occurs by emitting infrared light, via high current, for brief periods of times, as opposed to continuously emitting infrared light at high current. That is one reason why utilizing one or more flashes is desirable.

As mentioned, the low-current switch-mode power-supply may charge the capacitor at low and constant current. This may occur before, during, or after a flash. The capacitor may store electrical energy from the low and constant current. While the capacitor may take in low and constant current from the low-current switch-mode power-supply, the capacitor, during a flash, may discharge high current, via the high-current LED driver, to the IR LED. In addition to being current-limited, the low-current switch-mode power supply may be voltage-limited. Thus the low-current switch-mode power supply may be selected to yield an average power that is at or below a threshold value. The threshold value may be associated with the illuminator.

As mentioned, the voltage monitor may determine a fault condition for the system 200. For example, the voltage monitor may determine that the capacitor has 0V and is not charging. This determination may occur over a period of time. In reaching that determination, the voltage monitor may further determine that the system 200 is in a fault condition. As an alternative, the voltage monitor may determine that the voltage is under a target voltage for an extended period of time. The target voltage may be a maximum voltage that the capacitor is able to store when the IR LED is not emitting IR light. That extended period of time may be greater than the duration of a flash. In analyzing voltage of the capacitor, the voltage monitor may determine that the capacitor is not charging or inadequately charging. As such, the voltage of the capacitor may be greater than 0V, but could be far less than the target voltage. The voltage monitor may analyze voltage of the capacitor based on the synchronization signal. The synchronization signal may include a pulse duration for a flash, which may be a time value. The pulse duration may include a starting time and an ending time, where the pulse duration is the ending time minus the starting time. The voltage monitor may calculate a first voltage associated with the starting time of the pulse duration for the capacitor. Additionally, the voltage monitor may calculate a second voltage associated with the ending time of the pulse duration of the capacitor. The voltage monitor may subtract the first voltage from the second voltage to obtain a voltage difference. The second voltage may be less than the first voltage. From the voltage difference and the pulse duration, the voltage monitor may be able to analyze how the system 200 is performing.

In response to determining a fault condition, the system 200 may alert an occupant. As an alternative, the system may alert other systems onboard the vehicle. The alert may indicate a performance level associated with the system 200. The alert may encourage the occupant to have the system 200 serviced. The alert may be an audible alert via an audio system, a visual alert via a display system, or both. As other alternatives, in response to determining the fault condition, the system 200 may automatically shutdown or reset the system 200.

In a fault condition, the IR LED may be continuously emitting IR light, as opposed to one or more flashes. However, the occupant will not be continuously exposed to IR light from high current, because high-current is at least based on the capacitor. Thus, when the capacitor is depleted of electrical energy, the IR LED will not receive high current. Instead, when the capacitor is depleted, the IR LED will only receive low and constant current, via the low-current switch-mode power-supply. This results in a better experience for the occupant, for even though the system is in the fault condition, the occupant is not exposed to continuous IR light from high current.

Figure 3A:
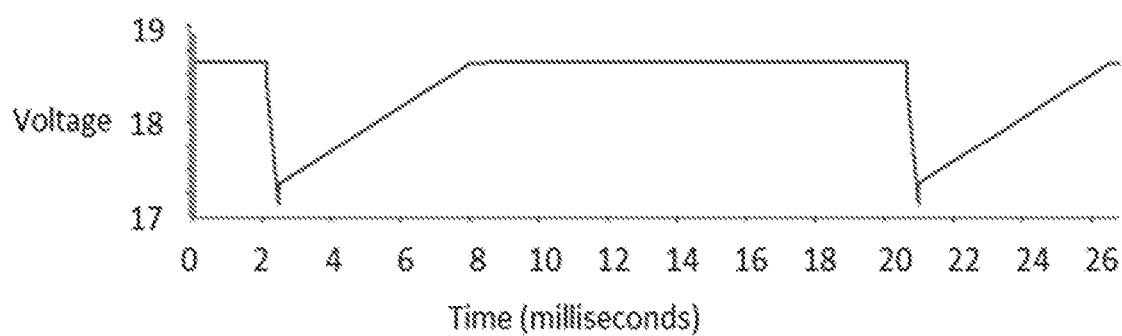
FIGS. 3A-3B illustrate charts of a normal operation of a system, including an energy storage element and an illuminator, for monitoring an occupant, which is in accordance with one or more embodiments.
Figure 3B:
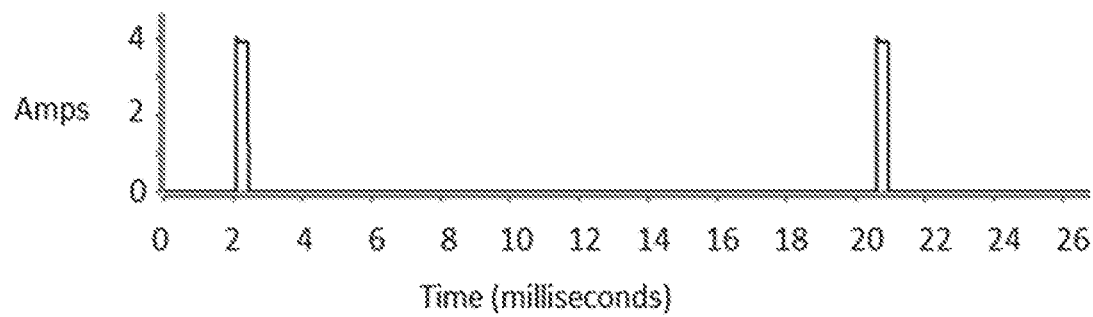

In accordance with one or more embodiments herein, FIGS. 3A and 3B illustrate a normal operation of a system for monitoring an occupant in a vehicle. FIG. 3A illustrates operation of an energy storage element of the system, such as a capacitor. FIG. 3B illustrates operation of an illuminator of the system, such as an IR LED. FIGS. 3A and 3B are time aligned. At the 0 millisecond mark, the energy storage element has a full-charge, and the illuminator is not drawing any current and therefore not emitting any electromagnetic radiation. At the 2 millisecond mark, the energy storage element begins to discharge stored electrical energy to the illuminator. This is a rapid discharge of high-current. As FIG. 3B, within a fraction of a millisecond, the illuminator spikes to slightly above 4 amps. The illuminator settles down to 4 Amps for roughly a half of a millisecond. From there, the illuminator rapidly falls back down to 0 Amps. This illustrates an example of a flash of the illuminator. After the flash, the energy storage element is re-charged at a slow and constant rate, until the energy storage element is once again fully charged. From there, FIGS. 3A and 3B illustrate another flash, which occurs between 20 milliseconds and 22 milliseconds, more specifically around the 21 millisecond mark.

Figure 4A:
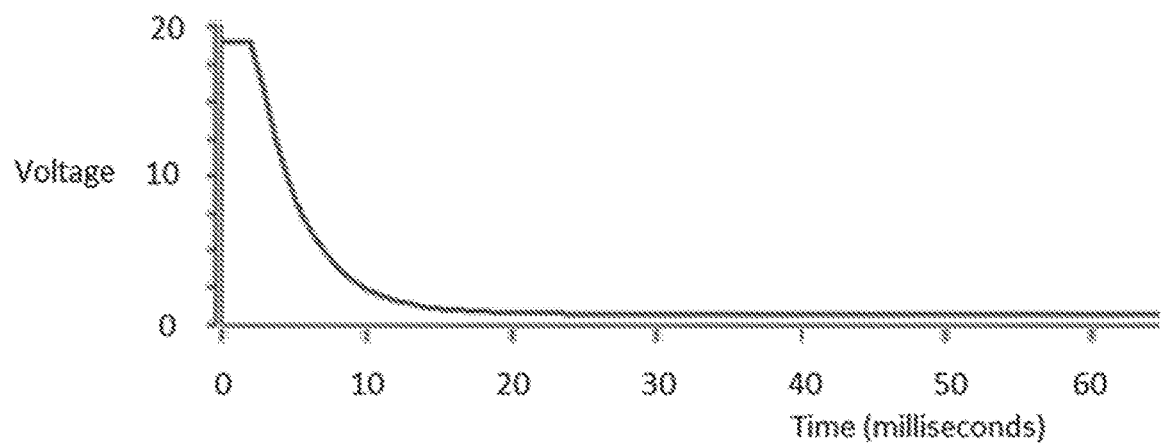
FIGS. 4A-4B illustrate charts of a fault condition of a system, including an energy storage element and an illuminator, for monitoring an occupant, which is in accordance with one or more embodiments.
Figure 4B:
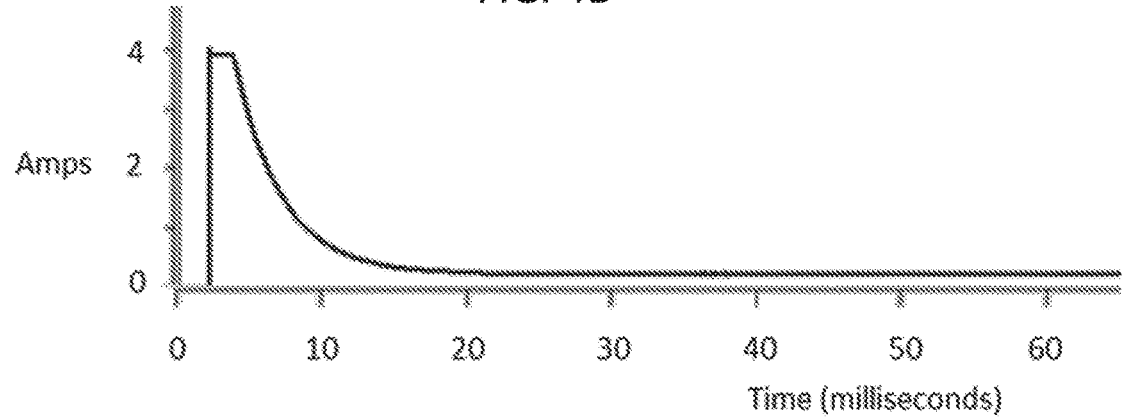

In accordance with one or more embodiments, FIGS. 4A and 4B illustrate a fault condition of a system for monitoring an occupant in a vehicle. FIG. 4A illustrates operation of an energy storage element of the system, such as a capacitor. FIG. 4B illustrates operation of an illuminator of the system, such as an IR LED. FIGS. 4A and 4B are time aligned. At the 0 millisecond mark, the energy storage element has a full-charge, and the illuminator is not drawing any current and therefore not emitting any electromagnetic radiation. Around 2 milliseconds, the illuminator spikes to slightly above 4 amps. This is a result of the energy storage element rapidly discharging high-current to the illuminator. In connection with this spike, the illuminator emits electromagnetic radiation. In a normal operation, the system would cause the illuminator to emit electromagnetic radiation for a brief period of time (i.e., a flash). However, in the fault condition, the illuminator fails to fall back down to 0 Amps. Instead, the non-zero draw of current means that the illuminator continues to emit electromagnetic radiation. However, the illuminator does not do so continuously at high-current. Instead, as the capacitor becomes significantly depleted, the illuminator tapers off from emitting electromagnetic radiation at high-current. This may be seen by the taper following the 4 Amp plateau for the illuminator in FIG. 4B. Because of the significant depletion of the capacitor, the illuminator falls to emitting electromagnetic radiation at low current: around 0.2 amps. This is because the system includes a low-current switch-mode power-supply.

Figure 5:
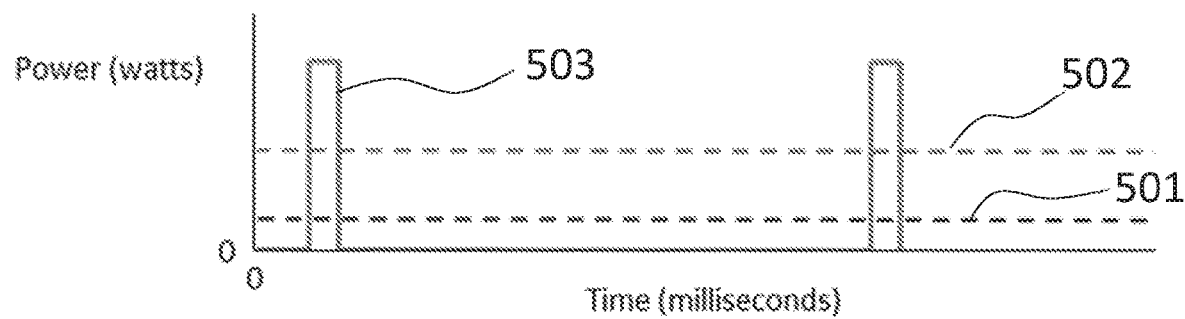
FIG. 5 illustrates a chart of an operation of a system for monitoring an occupant, which is in accordance with one or more embodiments.

In accordance with one or more embodiments, FIG. 5 illustrates an operation of a system for monitoring an occupant in a vehicle. During the operation, the system includes an average power for an illuminator 501 that is at or below a threshold value for an average power of the system 502. The threshold value may be set to meet industry or regulatory standards. FIG. 5 further illustrates an operation of the illuminator over time 503. While the operation of the illuminator may exceed the threshold value on occasion, such as during a flash, the average power for the illuminator is less than or equal to the threshold value. In a normal operation or in a fault condition, such as when the illuminator is continuously emitting (as opposed to flashes), the average power of the illuminator will still be less than or equal to the threshold value.

In accordance with one or more embodiments, FIG. 6 illustrates an operation of a system 600 under a normal condition. In the normal condition, step 601 draws low and constant current from a power source to a switch-mode power supply. Step 602 charges an energy storage element with low and constant current from the switch-mode power supply. In step 603, a current driver supplies high current, from the energy storage element, to an illuminator, for a brief period of time. In step 604, in response to the supply of high current, the illuminator emits electromagnetic radiation for the brief period of time. In step 605, the system 600 waits before looping back to step 603. The wait is a time delay. The time delay may be greater than the brief period of time. This operation may allow the system to produce an average power that is less than or equal to a threshold value associated with the illuminator.

In accordance with one or more embodiments, FIG. 7 illustrates an operation of a system 700 under a fault condition. In the fault condition, step 701 draws low and constant current from a power source to a switch-mode power supply. In step 702, the switch-mode power supply supplies low and constant current to an illuminator. In step 703, the illuminator continuously emits electromagnetic radiation, at the low and constant current. Similar to the normal condition in FIG. 6, this operation, under the fault condition, may allow the system to produce an average power that is less than or equal to a threshold value associated with the illuminator.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for monitoring an occupant in a vehicle, the system comprising:
    an illuminator for emitting electromagnetic radiation to be detected by a detection device for monitoring the occupant;
    a driver device for supplying power to the illuminator at a first power level sufficient for allowing the illuminator to emit electromagnetic radiation at a peak level for a short time period;
    an energy storage element electrically connected to the driver device and configured to supply the illuminator with the first power level to emit electromagnetic radiation at the peak level for the short time period; and
    a power supply device electrically connected to the energy storage element and configured to supply power to the energy storage element at a second power level, wherein the second power level is less than the first power level.

2. The system of claim 1, wherein the power supply device is configured to produce an output signal that is at least current-limited, for charging the energy storage element, and to produce the output signal having an average power that is less than or equal to a predetermined threshold value.

3. The system of claim 1, wherein the power supply device is configured as a switch-mode power supply device to supply constant current to the illuminator, at least responsive to the energy storage element being depleted of energy.

4. The system of claim 1, further comprising a monitoring device configured to monitor an electrical property of the energy storage element.

5. The system of claim 1, wherein the illuminator is configured to emit electromagnetic radiation as a plurality of flashes, in each flash, the illuminator is configured to emit electromagnetic radiation for a period, and in between each flash, the illuminator is configured to be off.

6. The system of claim 1, wherein the illuminator is configured to include a low-duty cycle for producing an average power that is at or below a threshold value associated with the illuminator.

7. The system of claim 6, wherein the illuminator is configured to produce, for each one of a plurality of flashes, a peak power that exceeds a threshold value for a period, and wherein the driver device is configured to supply current, from the energy storage element to the illuminator, for each flash of the plurality of flashes.

8. The system of claim 1, wherein the driver device is configured to receive a synchronization signal from a detection device for synchronizing an emission of electromagnetic radiation from the illuminator with an operation of the detection device.

9. The system of claim 1, wherein the energy storage element includes a capacitor configured to receive constant current from a power supply device for charging the capacitor.

10. The system of claim 1, wherein the illuminator includes an infrared light-emitting diode configured to emit electromagnetic radiation in the form of infrared light for monitoring the occupant.

11. A system for monitoring an occupant in a vehicle, the system comprising:
    an energy storage element for supplying, in a first mode, power to an illuminator for emitting electromagnetic radiation for monitoring the occupant in the vehicle;
    a monitoring device for monitoring an electrical property of the energy storage element and for determining a fault condition for the energy storage element based on the electrical property; and
    a power supply device for supplying, in a second mode, power to the illuminator, wherein the second mode is due to the fault condition, wherein the illuminator when in either the first mode or the second mode emits an average power for electromagnetic radiation that is less than or equal to a predetermined threshold value.

12. The system of claim 11, wherein the power supply device is configured to produce an output signal that is at least current-limited, for charging the energy storage element, and to produce the output signal having an average power that is less than or equal to a predetermined threshold value.

13. The system of claim 11, wherein the power supply device is configured as a switch-mode power supply device to supply constant current to the illuminator, at least responsive to the energy storage element being depleted of energy.

14. The system of claim 11, further comprising a monitoring device configured to monitor an electrical property of the energy storage element.

15. The system of claim 11, wherein the illuminator is configured to emit electromagnetic radiation as a plurality of flashes, in each flash, the illuminator is configured to emit electromagnetic radiation for a period, and in between each flash, the illuminator is configured to be off.

16. The system of claim 11, wherein the illuminator is configured to include a low-duty cycle for producing an average power that is at or below a threshold value associated with the illuminator.

17. A method for monitoring an occupant in a vehicle, the method comprising the steps of:
- emitting electromagnetic radiation by an illuminator;
- detecting by a detection device the emitted radiation for monitoring the occupant;
- supplying power to the illuminator by a driver device at a first power level sufficient for allowing the illuminator to emit electromagnetic radiation at a peak level for a short time period;
- providing power by an energy storage element for supplying the driver device with the first power level; and
- supplying electrical power to the energy storage element by a power supply device at a second power level with reduced current and/or voltage in comparison to the first power level.

18. The method of claim 17, further comprising producing, by the power supply device, an output signal that is at least current-limited, for charging the energy storage element.

19. The method of claim 17, further comprising producing, by the power supply device, an output signal having an average power that is less than or equal to a predetermined threshold value.

20. The method of claim 17, further comprising supplying, by the power supply device, constant current to the illuminator, at least responsive to the energy storage element being depleted of energy.

* * * * *